Figure 1:
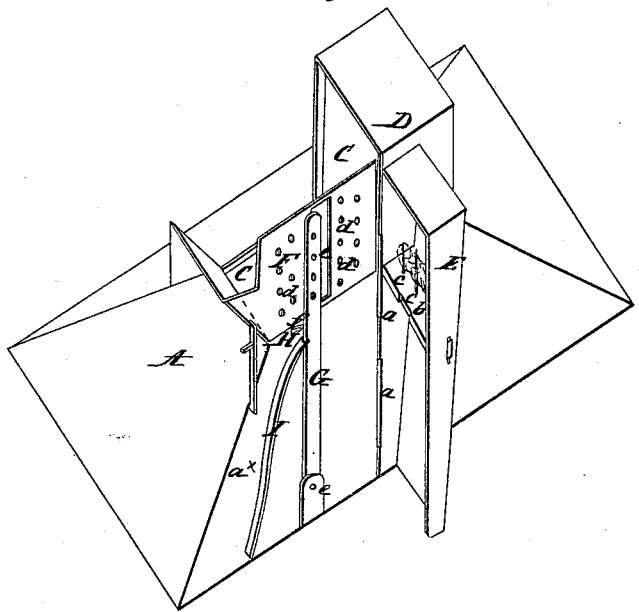

Sheet 1-2 Sheets.

J. Wheelock,
Cage Trap,

Nº 46,741.  Patented Mar. 7, 1865.

Witnesses:
Theo Tusch
C. L. Topliff

Inventor:
Jay Wheelock
per Munn & Co
Attorneys

Sheet 2-2 Sheets.
J. Wheelock,
Cage Trap.
Nº 46,741.   Patented Mar. 7, 1865.
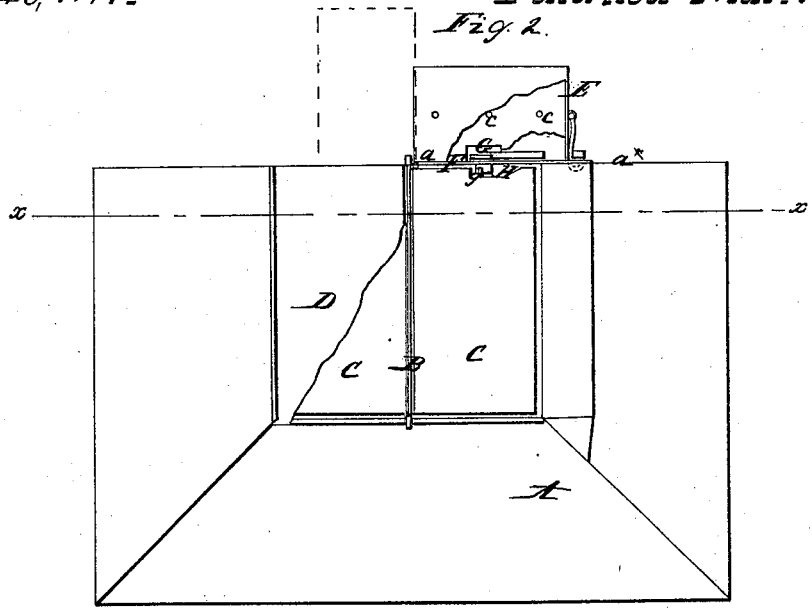
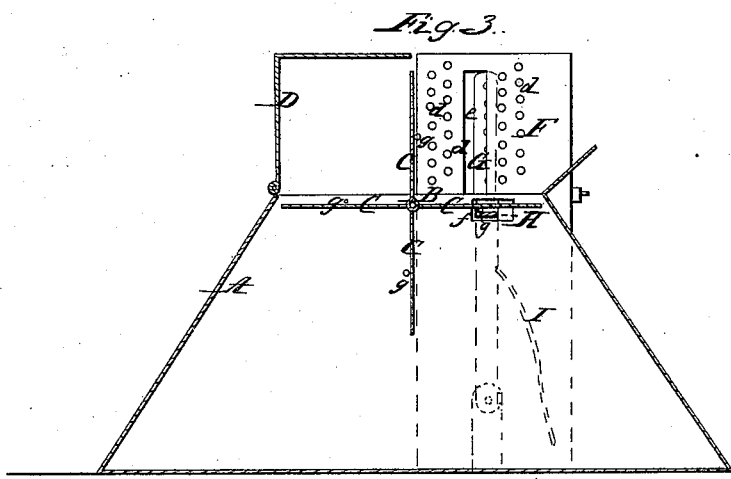
Witnesses:
Theo. Tusch
C. S. Topliff
Inventor:
Jay Wheelock
per Munn & Co
Attorneys

UNITED STATES PATENT OFFICE.

JAY WHEELOCK, OF SAN FRANCISCO, CALIFORNIA.

IMPROVEMENT IN ANIMAL-TRAPS.

Specification forming part of Letters Patent No. 46,741, dated March 7, 1865.

*To all whom it may concern:*

Be it known that I, JAY WHEELOCK, of San Francisco, in the county of San Francisco and State of California, have invented a new and Improved Animal-Trap; and I do hereby declare that the following is a full, clear, and exact description thereof, which will enable others skilled in the art to make and use the same, reference being had to the accompanying drawings, forming a part of this specification, in which—

Figure 1, Sheet No. 1, is a perspective view of my invention; Fig. 2, Sheet No. 2, a plan or top view of the same; Fig. 3, a vertical section of the same, taken in the line $x\,x$, Fig. 2.

Similar letters of reference indicate like parts.

This invention relates to a new and improved trap for catching rats, game, &c., and it is an improvement in that class of traps which are commonly termed "self-setting," and have a series of revolving platforms held in a horizontal position by a catch or fastening which is actuated by the animal in endeavoring to reach the bait, so as to release the platform and cause the animal to drop into a box below the platforms successively assuming a horizontal position for the animals to pass upon.

The object of the invention is to obtain a trap of the class specified, which will be simple in construction, and which will preserve the bait, the same being beyond the reach of the animal at all times, and which will admit of old bait being readily changed for fresh whenever required.

A represents a box, which may be constructed of wood or sheet metal, of quadrilateral form, and with three inclined sides and one vertical side. In the upper part of this box there is placed a horizontal shaft, B, which has four radial plates, C, attached to it. These plates serve as platforms for the animal to stand upon in attempting to get at the bait. One of these platforms only is exposed at once, as one-half of the device is covered by a cap, D. (Shown clearly in Fig. 3.)

E represents an upright box which is connected by hinges, $a$, to the vertical side $a^\times$ of the box A. This box E has a horizontal partition, $b$, in it, to which upright pins $c$ are attached, said pins forming a rack behind which the bait is placed, the bait, when the box E is closed against the side of box A, being in line with the exposed horizontal platform C. A portion of the side $a^\times$ of the box A, to which the bait-box E is attached, extends upward as high as box E to form a partition, F, between said box and the exposed platform, and this partition is perforated with holes $d$, as shown clearly in Figs. 1 and 3. Besides these holes an oblong vertical slot, $e$, is made in the partition F, and to the vertical side $a^\times$ a lever, G, is attached by a pin, $e$, said lever having a plate, H, projecting horizontally from it, which plate passes through a slot, $f$, in the side $a^\times$ for pins or rods $g$ at the under sides of the platforms C to rest upon, the front ends of said pins or rods projecting in front of notches or recesses $h$ in the inner edges of the platform. (See Fig. 2.)

The plate H of the lever G is kept in proper position to receive the ends of the pins or rods $g$, and hold the platforms in a horizontal position by means of a spring (I,) shown clearly in Fig. 1, said spring having a tendency to keep the plate H in contact with the inner edge of the slot $f$. The lever G extends up and projects beyond one side of the slot $e$ in the partition F, as shown in Figs. 1 and 3.

The operation is as follows: The bait is placed on the partition $b$ in the box E, behind the pins $c$, and the box then closed in contact with the vertical side $a^\times$ of the box A, a platform, C, being held in a horizontal position in front of the partition F. The animal in attempting to reach the bait, passes on the exposed horizontal platform C, and shoves aside with his nose the lever G as he thrusts the former through the slot $e$ in the partition F, and by so doing the plate H of lever G is shoved from underneath the pin or rod $g$, and the platform falls or turns down, causing the animal to drop into box A, a succeeding platform being caught and retained by the plate H, which is shoved in proper position by the spring I as soon as the lever G is relieved from the nose of the animal.

By this arrangement it will be seen that a self-setting trap is obtained, and one in which the bait is rendered inaccessible to the animal, and cannot, therefore, be removed in order to render the device useless. The bait can also readily be removed when necessary with the greatest facility, the box E being simply required to be opened.

I do not claim the revolving platforms C, for they have been previously used and constitute an old and well-known device for the purpose herein described.

Having thus described my invention, I claim as new and desire to secure by Letters Patent—

1. The lever G, provided with the plate H and spring I, in combination with the slot e in the partition F and the revolving platforms C, all arranged in connection with the box or animal-receptacle A, to operate substantially as and for the purpose specified.

2. The bait-box E, connected to the box or animal-receptacle A, and arranged in relation with the lever G, partition F, and revolving platforms C, substantially as and for the purpose set forth.

JAY WHEELOCK.

Witnesses:
JAMES S. ALLEN,
SAMUEL NEWMAN.